J. A. MANNING.
Car Coupling.
No. 80,493. Patented July 28, 1868.
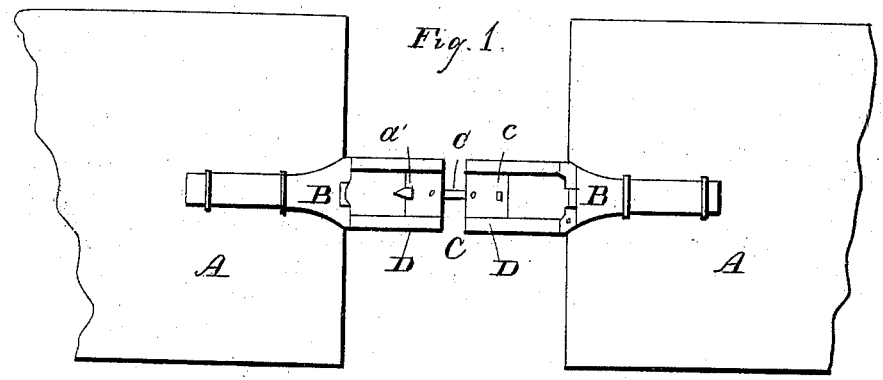
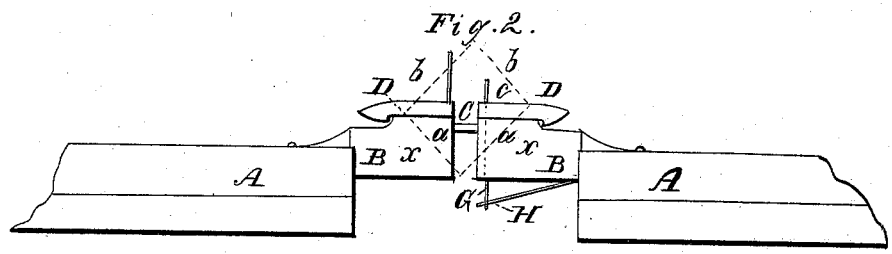
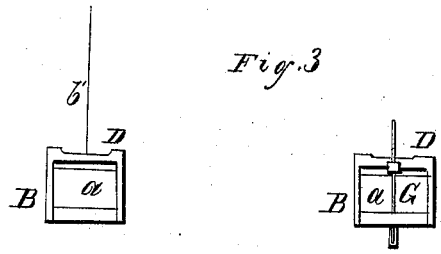

United States Patent Office.

J. A. MANNING, OF ASHTABULA, OHIO.

Letters Patent No. 80,493, dated July 28, 1868.

---

IMPROVED CAR-COUPLING.

---

The Schedule referred to in these Letters Patent and making part of the same.

---

TO ALL WHOM IT MAY CONCERN:

Be it known that I, J. A. MANNING, of Ashtabula, in the county of Ashtabula, and State of Ohio, have invented certain new and useful Improvements in Railroad-Car Couplings; and I do hereby declare that the following is a full and complete description of the construction and operation of the same, reference being had to the accompanying drawings, making a part of this specification, in which—

Figure 1 is a top view of the coupling.

Figure 2 is a side view.

Figure 3 is end views of the same.

Like letters of reference refer to like parts in the views.

In fig. 1, A represents the platform of the car, to the under side of which the coupling is attached, and which consists of the bunter B, having a wide, open mouth for the admission of the hook C.

The bottom of the mouth slants backward and upward, forming an inclined plane, as indicated by the dotted line $a$, fig. 2, the purpose of which will hereafter be shown.

D is a catch or fall fitted in and pivoted to the bunter at the point $x$, so that it can be raised upward, as indicated by the dotted line $b$.

This fall, it will be observed, is provided with a hook, whereby it is made to lock into the bunter, as shown in the drawing, thereby placing the draught of the car on the fall, instead of the pivot, by which it is secured to the bunter.

The practical operation of this coupling is as follows:

One end of the hook or link C is secured in the mouth of the bunter by a bolt, $c$, projected downward through the bunter and hook. By this means the hook is held permanently in place, and projects from the mouth of the bunter, to be received by that on the proximate car, into which it is received by the end of the hook sliding up the inclined plane, pushing upward the fall D, until the hook penetrates beyond the edge $a'$, fig. 1, which allows the fall to drop. The hook being upward, catches upon said edge, and is thereby secured from being withdrawn, which, however, may be done by lifting up the fall and thus relieve the hook.

It is proposed to lift the fall for uncoupling by a cord, $b'$, fig. 3. This cord being attached to the fall, is then carried up to some convenient place above the platform, within easy reach of the car-tender. By this means he is enabled to uncouple the cars without going between them for that purpose, thus avoiding the danger consequent of the cars coming together.

In order to keep the projecting hook straight in line with the mouth of the bunter, so that it shall enter without striking, a small chain, G, fig. 3, is run through the bunter and hook. The upper end of said chain is fastened to the fall, whereas the lower end is attached to a spring, H, by which a tension is given to the chain. By this means the hook, if turned to either side, will immediately return to a straight position, so that it will enter the mouth of the bunter without striking against the sides.

What I claim as my improvement, and desire to secure by Letters Patent, is—

The hooked fall D, as constructed, arranged, and operated in combination with buffer-head B and link C, for the purpose and in the manner as described.

J. A. MANNING.

Witnesses:
W. H. BURRIDGE,
J. HOLMES.